United States Patent
Yellapantula et al.

(10) Patent No.: US 8,019,012 B2
(45) Date of Patent: Sep. 13, 2011

(54) METHOD AND CONTROLLER FOR SYNCRONIZING A WIRELESS COMMUNICATION DEVICE AND NETWORK

(75) Inventors: Ramakrishna V. Yellapantula, Grayslake, IL (US); Joanne M. Beaumont, Cheltenham (GB); Vivek Ramaprasad, Palatine, IL (US); Brett L. Robertson, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1386 days.

(21) Appl. No.: 11/023,712

(22) Filed: Dec. 28, 2004

(65) Prior Publication Data

US 2006/0210004 A1    Sep. 21, 2006

(51) Int. Cl.
*H04B 7/02*    (2006.01)

(52) U.S. Cl. ........ 375/267; 375/260; 375/299; 375/340; 375/347; 375/354; 455/101; 455/132; 455/296; 455/502; 455/562.1; 370/203; 370/204; 370/206; 370/208; 370/210; 370/334; 327/141

(58) Field of Classification Search .......... 375/354, 375/267, 265, 376, 299, 347; 455/101, 132, 455/296, 500, 562.1; 370/334
See application file for complete search history.

(56) References Cited

U.S. PATENT DOCUMENTS

| 7,010,055 | B2 * | 3/2006 | Harrison et al. | 375/267 |
|---|---|---|---|---|
| 7,027,839 | B2 * | 4/2006 | Umesh et al. | 455/562.1 |
| 7,035,343 | B2 * | 4/2006 | Chi et al. | 375/265 |
| 7,133,647 | B2 * | 11/2006 | Dent | 455/75 |
| 7,366,247 | B2 * | 4/2008 | Kim et al. | 375/267 |
| 2003/0003873 | A1 * | 1/2003 | Raghothaman | 455/67.1 |
| 2003/0142755 | A1 | 7/2003 | Chi et al. | |
| 2004/0001556 | A1 | 1/2004 | Harrison et al. | |
| 2004/0147234 | A1 * | 7/2004 | Lin et al. | 455/101 |
| 2004/0233871 | A1 * | 11/2004 | Seki et al. | 370/331 |
| 2005/0123083 | A1 * | 6/2005 | Kawakami | 375/347 |
| 2005/0135530 | A1 * | 6/2005 | Joo et al. | 375/376 |
| 2005/0152263 | A1 * | 7/2005 | Speth | 370/203 |

OTHER PUBLICATIONS

3rd Generation Partnership Project. "3rd Generation Partnership Project: Technical Specification Group Radio Access Network; Physical layer Procedures (FDD) (Release 1999)", 3GPP TS 25.214 V3.7.0, Jun. 2001.

* cited by examiner

*Primary Examiner* — Leon Flores
(74) *Attorney, Agent, or Firm* — Lawrence J. Chapa

(57) ABSTRACT

A communication controller and a method is provided for synchronizing a wireless communication device and a wireless communication network having two or more transmit antennas, which support transmit diversity. A reference signal is received from the wireless communication network via each one of a pair of the two or more transmit antennas. A preferred phase offset is then determined for the pair of transmit antennas, and then transmitted to the wireless communication network. Further adjustments of the requested phase and amplitude of the communications transmitted using the pair of transmit antennas are suspended, until further transmissions are received from the wireless communication network via the corresponding transmit antennas, which can be decoded in accordance with the preferred phase offset or a timer has elapsed corresponding to the maximum time needed for the wireless communication network to receive the preferred phase offset and synchronize to the same.

19 Claims, 4 Drawing Sheets

METHOD AND CONTROLLER FOR SYNCHRONIZING A WIRELESS COMMUNICATION DEVICE AND NETWORK

FIELD OF THE INVENTION

The present invention relates generally to synchronizing a wireless communication device with a wireless communication network. More particularly, the present invention relates to synchronizing the wireless communication device with the wireless communication network having two or more antennas, which support transmit diversity.

BACKGROUND OF THE INVENTION

Transmit diversity is one approach, which has been introduced in an attempt to increase downlink capacity within a network. Transmit diversity involves transmitting data on two or more antennas, sometimes referred to as an antenna array, which are spaced apart geographically. Generally, the signals transmitted from each antenna will have different path loss characteristics, which are largely independent of one another. When transmitted from multiple, spaced apart antennas, the signals from each of the antennas will interact with one another, generally resulting in a transmission pattern that includes some areas where the signals will constructively combine, and other areas where the signals will destructively interfere. In at least some instances, including instances involving a pair of spaced apart antennas, the pattern produced by the constructive and destructive areas will form lobes, which propagate outward from the area centered around the transmit antennas. However, the size and shape of the various areas is dependent upon the number and positioning of the spaced apart antennas, as well as the transmit characteristics of the signal being conveyed, such as phase and amplitude.

The particular areas in which the signals will constructively combine and destructively interfere can often be controlled by introducing phase adjustments, in one or more of the signal sources, relative to the other signal sources. In at least some instances, a phase adjustment will effectively involve a delay in the transmission of one signal relative to another. At least some of the value in controlling the areas in which the signals constructively combine and destructively interfere will allow a transmitted signal to be better received by an intended recipient located in an area where the composite signal levels are enhanced. Furthermore, the interfering affects of the transmitted signal for non-intended recipients located in an area where the signals do not readily coherently combine are reduced, as a result of a composite signal level that is generally diminished.

In addition to adjusting the phase of a signal, in at least some instances, the amplitude of one or more of the signals can also be adjusted, which in turn will further affect the transmission pattern. Generally transmission characteristics, such as phase and amplitude, relative to each of the signal sources, are referenced as weighting parameters, which in turn combine to produce a weighting pattern, that can be applied to an antenna array.

As a signal recipient moves relative to transmitted signal sources, in order to continue to enjoy the intended benefits of transmit diversity the weighting parameters applied to the two or more antennas occasionally may need to be updated to insure that the new area in which the intended signal recipient is located corresponds to an area in which the signal level of the composite signal is enhanced. In many instances, the new weighting parameters are determined at least in part by the intended recipient, in response to the most recently received signals. The weighting parameters are then communicated back to the entity managing the downlink communication through feedback as part of a corresponding uplink communication. The feedback can take the form of requested adjustments to the weighting parameters that are intended to maintain a more optimal performance level of the downlink signal, relative to the intended recipient.

However, when a communication link is initially established between an intended recipient and the entity managing the downlink communication and/or before the downlink managing entity has achieved synchronization with the intended recipient, the information being formulated and communicated as feedback can be problematic, as the intended recipient may be requesting updates to the weighting parameters, which may assume that previously requested adjustments, have already taken effect. For example, the intended recipient may by formulating further feedback in view of feedback which has been previously requested, but whose effects have not yet manifested in the communication channel. Consequently, the requested adjustments may be based on assumed communication conditions, which are not yet current relative to all of the previously requested adjustments. This can sometimes result in an incorrect adjustment, which may further complicate any attempted synchronization.

Still further the latency period prior to adopting previously requested feedback can be problematic in so far as it may result in the erroneous decoding of subsequently received information that continues to be transmitted in accordance with an earlier weighting value, where the intended recipient is attempting to decode the information in accordance with a requested adjustment, which has not yet been adopted. Any resulting erroneous decoding of communicated information will generally further complicate any future attempts to formulate further requested adjustments and any corresponding subsequent antenna weighting pattern.

Consequently, a method for synchronizing a wireless communication device and a wireless communication network having two or more antennas, which support transmit diversity, and a corresponding communication controller would be beneficial.

SUMMARY OF THE INVENTION

The present invention provides for a method for synchronizing a wireless communication device and a wireless communication network having two or more transmit antennas, which support transmit diversity. The method includes receiving a reference signal from the wireless communication network via each one of at least a pair of the two or more transmit antennas. A preferred phase offset is then determined for the at least pair of transmit antennas, and then transmitted to the wireless communication network. Further transmissions are then detected from the communication network via the corresponding transmit antennas, and further adjustments of the requested phase and amplitude of the communications transmitted using the at least pair of transmit antennas are suspended, until further transmissions are received from the wireless communication network via the corresponding transmit antennas, which can be decoded in accordance with the preferred phase offset.

In at least one embodiment, the suspension of further adjustments of the requested phase and amplitude until further transmissions are received which can be decoded includes receiving a further transmission. A determination is then made whether the transmission can be decoded in accordance with the preferred phase offset. If the transmission can be decoded, further adjustments are enabled. If the transmission can not be decoded, then continuing to request the previously requested preferred phase offset.

In at least a further embodiment, a timer is initiated at the beginning of the suspension of further adjustments, where during the suspension, if the timer exceeds a predetermined time elapsed value, the suspension is terminated and further adjustments of the phase and amplitude are allowed.

The present invention further provides a communication controller for use in a wireless communication device. The communication controller includes a synchronization controller, interface circuitry, and a decoder. The interface circuitry is adapted for establishing and maintaining a communication connection with a wireless communication network. The decoder is adapted for decoding messages received from the wireless communication network, via the interface circuitry. The synchronization controller is adapted for receiving a reference signal transmitted from the wireless communication network via each one of a plurality of associated transmit antennas, and determining a preferred phase offset relative to each of the associated transmit antennas. The synchronization controller is further adapted for transmitting the preferred phase offset to the wireless communication networks, and suspending further adjustments of the requested phase and amplitude of the communications transmitted using the plurality of associated transmit antennas until further transmissions are received from the wireless communication network which can be decoded in accordance with the preferred phase offset.

In a further embodiment, the communication controller is incorporated as part of a cellular telephone.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
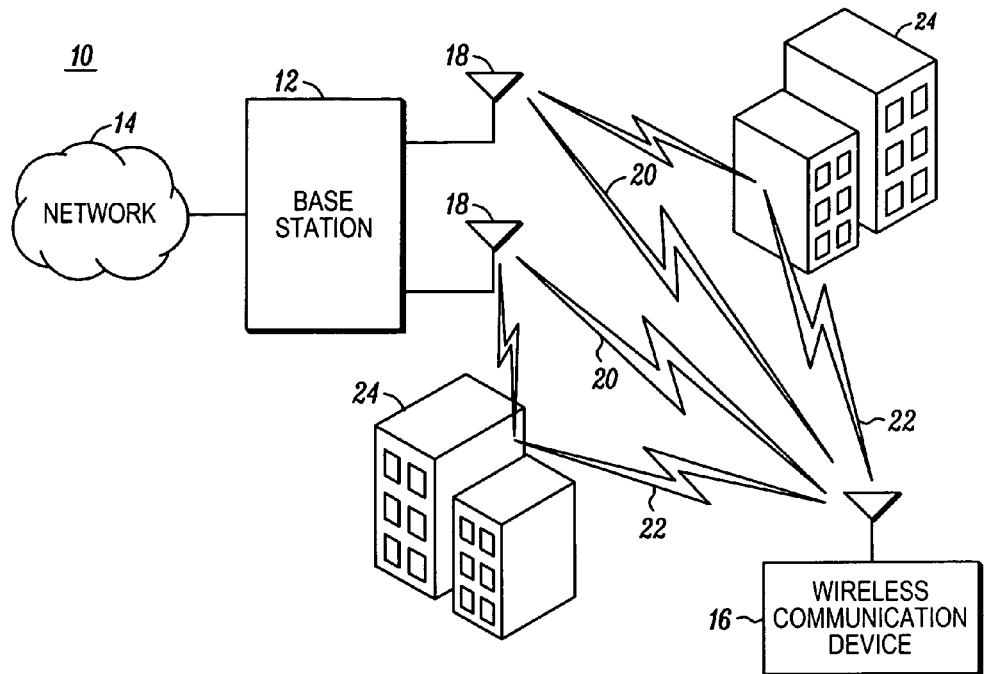
FIG. 1 is a block diagram of an exemplary wireless communication system illustrating an environment within which at least one embodiment of the present invention can operate.

FIG. 1 is a block diagram of an exemplary wireless communication system 10 illustrating an environment within which at least one embodiment of the present invention can operate. The wireless communication system 10 includes a base transceiver station 12, coupled to a network 14. The base transceiver station 12 serves as a wireless communication interface for the network 14, with one or more wireless communication devices 16. The base transceiver station 12 includes at least two or more antennas 18, which together support transmit diversity, where a corresponding signal is communicated to the intended recipient from each of the associated antennas 18. The antennas 18 are generally spaced sufficiently apart, geographically, relative to the other antennas, so as to provide channel characteristics, with respect to the intended recipients and each of the antennas 18, which are largely distinct. Together the two or more antennas 18 form an antenna array, which supports transmit diversity.

The channel characteristics relative to each of the antennas 18 are generally a function of the various communication paths, either direct 20 or indirect 22, that a signal transmitted from a particular antenna will traverse before being received by the intended recipient, such as the wireless communication device 16. Indirect communication paths 22 can often result from the signal being reflected off of intervening natural and non-natural structures, such as mountains or buildings 24.

As noted, by controlling the weighting parameters (i.e. phase and amplitude) of the signal communicated from each of the antennas, relative to the signals communicated from the other corresponding antennas, the signals received from the various antennas will combine at the intended receiver, with varying degrees of success. In at least some forms of transmit diversity, feedback signals from the intended recipient, (i.e. the wireless communication device 16), will enable adjustments to be made to the weighting parameters to help insure that the intended recipient initially receives and/or continues to receive signals, which coherently combine, as the intended recipient moves relative to each of the base transceiver station antennas 18.

Generally the wireless communication device 16 can take the form of many types of devices including a cellular telephone, a radio telephone, a cordless telephone, a personal digital assistant or a computer communicating wirelessly, for example using a wireless local area network card or a radio frequency modem. One skilled in the art will readily appreciate that the wireless communication device may take still further alternative forms, which are generally consistent with devices, which communicate wirelessly, without departing from the teachings of the present invention.

It is further noted that the network 14 can similarly take one of many different forms without departing from the teachings of the present invention. For example, the network 14 may include any type of network that is capable of sending and receiving communication signals. In at least one embodiment, the network 14 includes a wireless communication network. The network 14 may also include or be in communication with a data network, such as the Internet, an Intranet, a local area network (LAN), a wide area network (WAN), a cable network, and other like communication systems. The network 14 may also include or be in communication with a telecommunications network, such as a local telephone network, long distance telephone network, cellular telephone network, satellite communications network, cable television network and other like communications systems. Furthermore, the network 14 may include or be in communication with more than one network and may include a plurality of different types of networks. Thus, the network 14 may include or be in communication with a plurality of data networks, a plurality of telecommunications networks, or a combination of data and telecommunications networks and other like communication systems.

Figure 2:
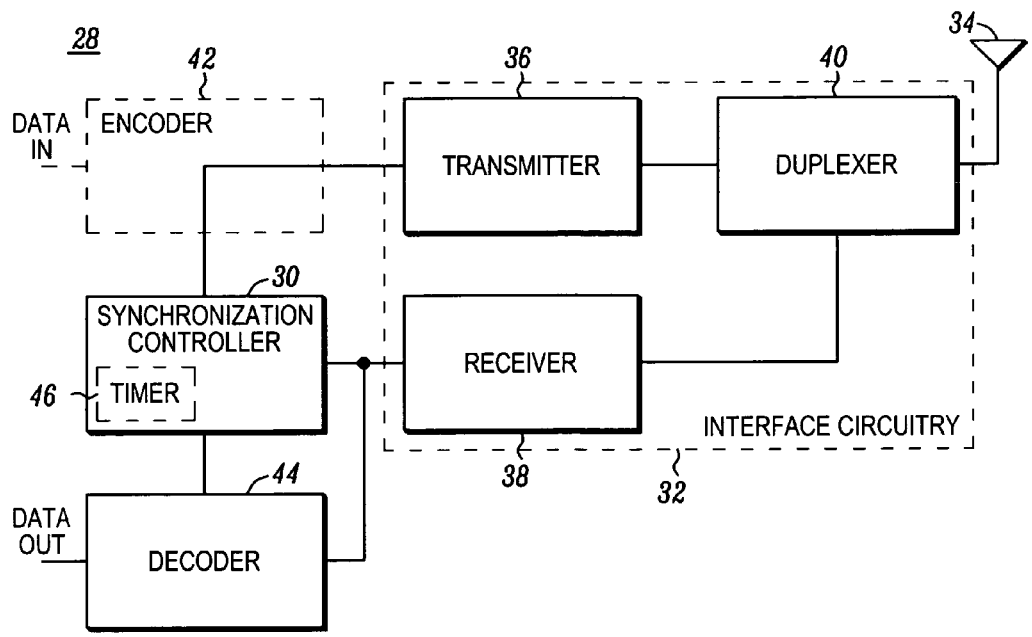
FIG. 2 is a block diagram of the exemplary communication controller for use in a wireless communication device, within which one or more signals can be received and feedback adjustments can be formulated and communicated to the network for synchronizing with a wireless communication network incorporating transmit diversity, in accordance with at least one embodiment of the present invention.

FIG. 2 illustrates a block diagram of an exemplary communication controller 28 for use with a wireless communication device 16, in accordance with at least one embodiment of the present invention, within which one or more signals from signal sources practicing transmit diversity can be received. The communication controller 28 is further adapted for formulating feedback adjustment requests, which can be communicated to the network 14 in an uplink transmission. The feedback adjustment requests are intended to facilitate the synchronization of wireless communication device 16 with the wireless communication network 14 incorporating transmit diversity.

The communication controller 28 includes a synchronization controller 30, where the synchronization controller 30 is generally adapted for receiving a signal transmitted from the wireless communication network 14, and/or the base transceiver station 12, from each of a plurality of associated transmit antennas 18. The signals are received by the synchronization controller 30 in conjunction with interface circuitry 32, and a corresponding antenna 34, where the interface circuitry is generally adapted for establishing and maintaining a communication connection with the wireless communication network 14. The synchronization controller 30 is further adapted for determining a preferred phase offset relative to each of the associated transmit antennas 18, based upon the received signal, and transmitting the preferred phase offset to the wireless communication network 14, similarly via the interface circuitry 32. In turn, the preferred phase offset transmitted by the wireless communication device can be received by and used to adjust the subsequent weighting parameters used in conjunction with the one or more antennas 18 forming the antenna array of the wireless communication network 14 including the base transceiver station 12.

In at least one embodiment, the interface circuitry 32 can include a transmitter 36 and a receiver 38, which are coupled to the antenna 34, via a duplexer 40. In some embodiments, the interface circuitry 32 may alternatively include and/or may alternatively be identified as a transceiver.

At least one standard, which supports transmit diversity, namely the 3rd Generation Partnership Project (3GPP), provides at least two closed loop transmit diversity modes, each of which incorporates the use of a pair of antennas. A first closed loop transmit diversity mode includes provisions for the identification of four different phase differentials or phase offsets ($<w1$-$<w2$), which can be selected, namely (45 degrees, 135 degrees, −135 degrees, and −45 degrees), while the amplitude for each of the antennas is generally kept relatively constant ($/w1/$=$/w2/$=0.5). In order to uniquely identify and correspondingly request each of the possible phase and amplitude combinations, a pair of feedback bits capable of distinguishing between the four possible phase offset selections is used. A second closed loop transmit diversity mode includes provisions for the identification of eight different phase offsets, which can be selected, namely (0 degrees, 45 degrees, 90 degrees, 135 degrees, 180 degrees, −135 degrees, −90 degrees, and −45 degrees), while the amplitudes for each of the antennas can be selected from between two different combinations ($/w1/$=$/w2/$=0.8, and $/w1/$=0.8, $/w2/$=0.2). In order to uniquely identify, and correspondingly request each of the possible phase and amplitude combinations, four feedback bits are used for distinguishing between the eight possible phase offsets and the two possible amplitude selections (total of 16 possible variations).

Generally, the feedback bits are determined by the synchronization controller 30, based upon an analysis of the signals received from each of the transmit antennas 18. More specifically, the signals which are analyzed will often involve a reference signal transmitted as part of the downlink transmission, such as the common pilot channel (CPICH). If an adjustment of the weighting parameters is desired, (i.e. an adjustment is believed will enhance the coherent combining of the two signals), the corresponding feedback bit pattern is determined and is communicated to the network, via the interface circuitry 32 and more specifically the transmitter 36, as part of an uplink transmission.

In some instances, the feedback bit pattern is interleaved with other data being transmitted, and may be spread across one or more assigned communication slots. In at least one embodiment each bit of the bit pattern is included as the first bit in a plurality of sequentially assigned communication slots. In these instances, an encoder 42 may be used to properly format and correspondingly interleave the bits with data from other data streams. In other instances the synchronization controller 30 may be additionally adapted for performing this task. A decoder 44 is correspondingly coupled to the interface circuitry 32 and the synchronization controller 30, and is adapted for decoding the signals received via the interface circuitry 32 and any messages contained therein. The ability of the decoder 44 to decode messages from the signal received can sometimes be dependent upon the quality and characteristics of the received signal, and can sometimes be dependent upon a current understanding of the transmit weighting parameters used.

In at least some instances, the initial adjustment values supplied as part of the uplink transmission, prior to synchronization will include a repeated fixed bit pattern, in order to help minimize initial decoding errors. In at least some embodiments of the first closed loop transmit diversity mode, an initial phase offset of 45 degrees will be selected, which corresponds to a repeated fixed bit pattern. In at least some embodiments of the second closed loop transmit diversity mode, an initial phase offset of 180 degrees will be selected.

The synchronization controller 30 is still further adapted to suspend further adjustments of the requested phase and amplitude of the communications transmitted using the plurality of associated transmit antennas until further transmissions are received from the wireless communication network 14, including in at least some instances the base transceiver station 12, which can be decoded in accordance with the previously determined preferred phase offset. In this way, the synchronization controller will delay further adjustments of the requested phase offset until after the current weighting parameters have incorporated the previously requested preferred phase offset. Generally, upon receipt of communications which can be decoded in accordance with the previously requested preferred phase offset, the wireless communication network and the wireless communication device will enter normal closed loop operation, in which further adjustments of the requested phase and amplitude are enabled.

In some embodiments, the synchronization controller includes a timer 46, which is adapted to be initiated, when a preferred phase offset is initially transmitted, prior to synchronization. In accordance with at least some embodiments, the predetermined time elapsed value is set to minimally exceed the maximum time needed for the wireless communication network to receive the initial preferred phase offset and synchronize to the same. If during the period of time in which the decoder is attempting to decode the further transmissions, the timer exceeds a predetermined time elapsed value, the suspension of further adjustments is terminated and further adjustments of the phase and amplitude are allowed.

Figure 3:
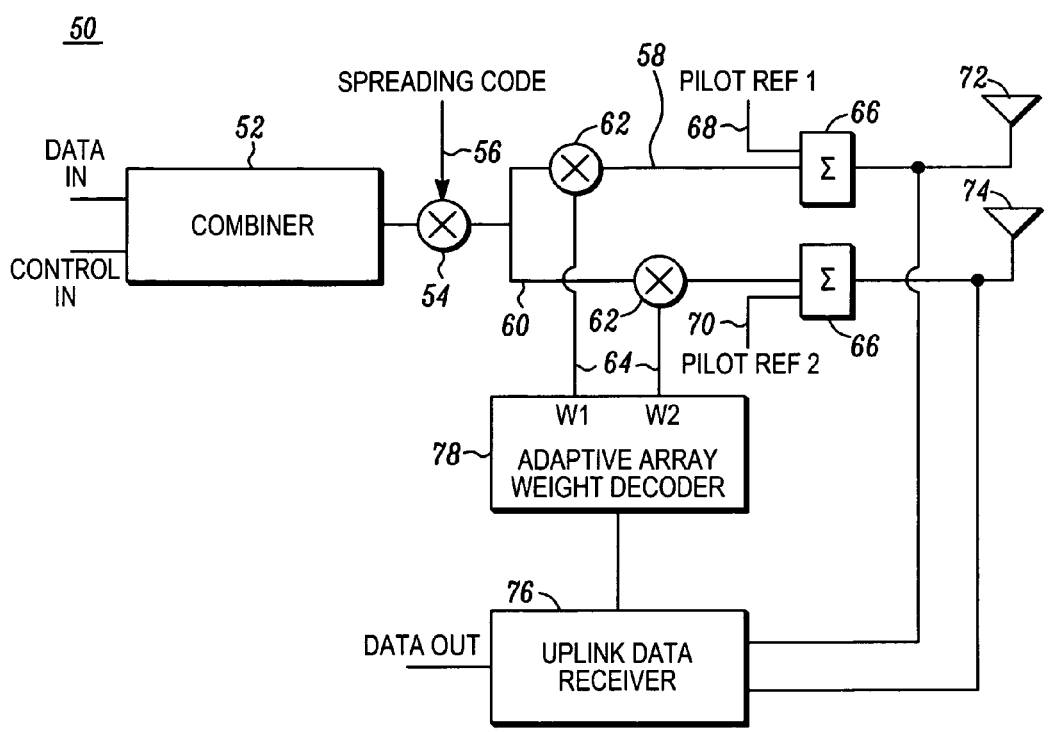
FIG. 3 is a block diagram of a portion of a base transceiver station, for use in communicating with the wireless communication device using transmit diversity.

FIG. 3 illustrates a block diagram of a portion 50 of a base transceiver station 12, for use in communicating with the wireless communication device 16 using transmit diversity. Generally, the base transceiver portion 50 includes a signal combiner 52 for receiving one or more information streams, such as data and control information, and combines and formats the same for transmitting wirelessly. In at least one embodiment, the combiner 52 receives information associated with a dedicated physical data channel (DPDCH) and information associated with a dedicated physical control channel (DPCCH) for formulating a dedicated physical channel (DPCH). The combined information (i.e. data stream) is then modulated by a modulator 54, so as to be substantially orthogonally spread relative to other physical channels, using a spreading code sequence 56. The modulated spread data stream is then fed to alternative branches 58, 60 of a diversity transmitter, wherein the signal stream associated with each branch is weighted by a modulator 62, 63 using the weighting values 64 associated with each of the corresponding branches 58, 60. In at least some embodiment of the present invention, the weighting values 64 will selectively adjust the phase and amplitude of the signal being communicated in each branch 58, 60.

The weighted and modulated signal in each branch is then respectively received at a signal combiner 66, which combines the weighted and modulated signal with a corresponding reference signal, such as one of a pair of pilot channels 68, 70. Each of the corresponding combined, weighted and modulated signals are then wirelessly transmitted, via a respective antenna 72, 74. In at least some embodiments the reference signals 68, 70 will be the same, with the exception that the amplitude and the phase of the reference signals will have been properly adjusted. In other instances, each of the reference signals 68, 70 may be different.

In addition to transmitting the combined weighted and modulated signal, the antennas 72, 74 additionally receive uplink transmissions communicated from the wireless communication device, which was the intended recipient of the combined weighted and modulated signal. The uplink transmissions will often include feedback information having transmit diversity adjustment information in the form of an adjustment request. The uplink transmission is received by an uplink data receiver 76, which in turn is forwarded to an adaptive array weighting value decoder 78, which is able to receive and/or extract the transmit diversity adjustment information from the uplink transmission. The adaptive array weighting value decoder 78 then uses the transmit diversity adjustment information to maintain or alter the weighting values 64 associated with each of the corresponding branches 58, 60.

It can be noted, that generally, there is an inherent delay associated with the time between when an adjustment of the weighting values is requested and the adjustment is applied to subsequent diversity signals which are transmitted. Suspending further adjustments at the communication controller 28, until further transmission has been received by the wireless communication device 16, which can be decoded in accordance with the previously requested preferred phase offset enables the portion 50 of a base transceiver station 12, for use in communicating with the wireless communication device 16 using transmit diversity to apply any requested weighting value adjustments before enabling further adjustments requests and/or entering normal closed loop operation. This allows the wireless communication network 14 to more systematically synchronize with the wireless communication device 16.

In at least some embodiments, all or parts of the various elements illustrated in FIGS. 2 and 3, can be implemented using one or more sets of prestored instructions to be executed in one or more microprocessors. In the same and/or other embodiments, the same and/or other parts of the various elements can be alternatively and/or partially implemented in hardware using discrete or integrated circuit elements, including logic gates and/or sequential state machines. Furthermore, to the extent that prestored instructions may be used, the prestored instruction can take the form of software instructions and/or microcode. However, one skilled in the art will readily appreciate that still further approaches are possible for implementing the same without departing from the teachings of the present invention.

Figure 4:
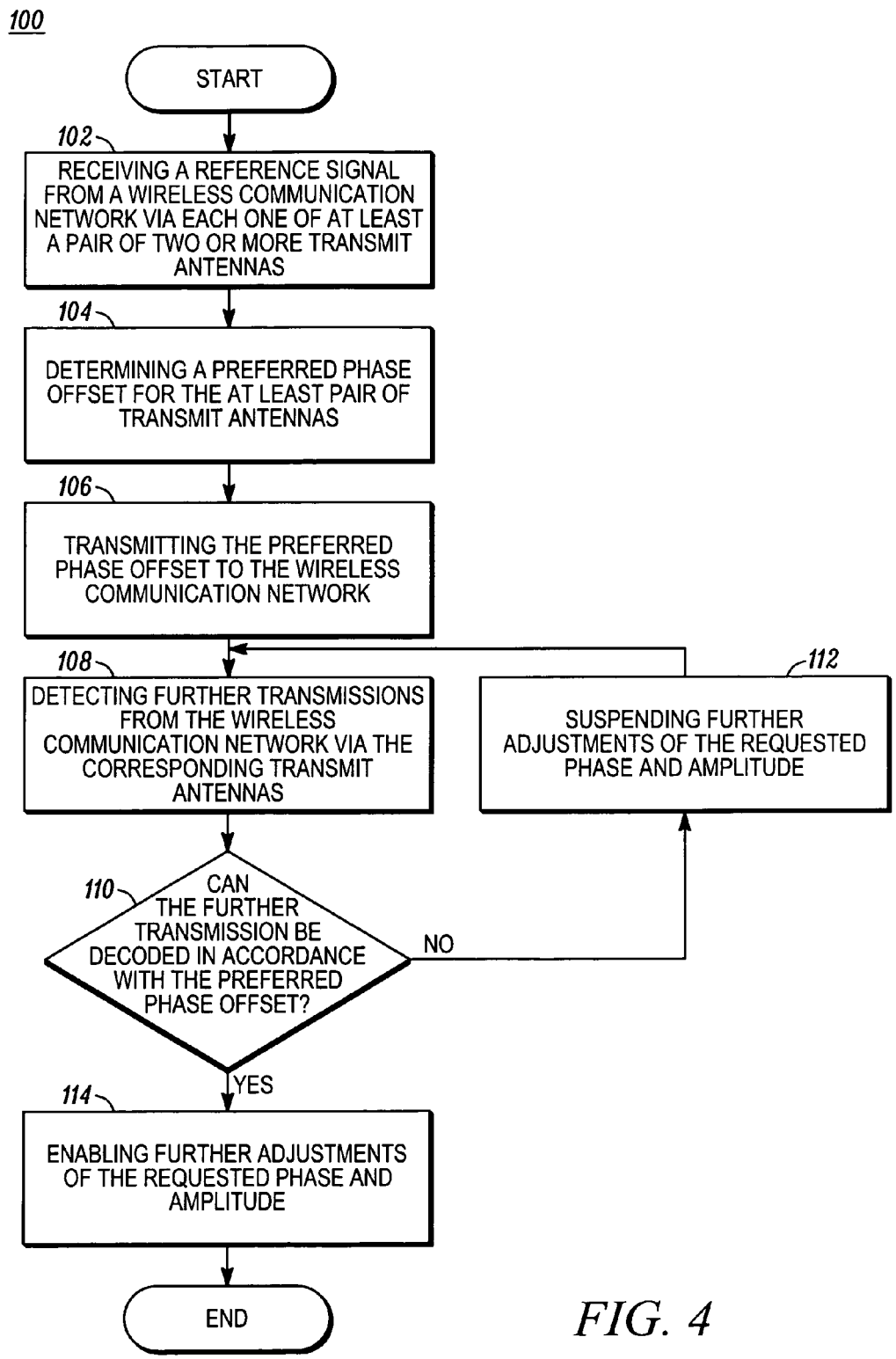
FIG. 4 is a flow diagram of a method for synchronizing a wireless communication device and a wireless communication network having two or more transmit antennas, which support transmit diversity, in accordance with at least one embodiment of the present invention.

FIG. 4 illustrates a flow diagram 100 of a method for synchronizing a wireless communication device and a wireless communication network having two or more transmit antennas, which support transmit diversity, in accordance with at least one embodiment of the present invention. The method includes receiving 102 a reference signal from a wireless communication network, via each one of at least a pair of two or more transmit antennas. A preferred phase offset is then determined 104 for the at least pair of transmit antennas, and then transmitted 106 to the wireless communication network.

Further transmissions from the wireless communication network, via the corresponding transmit antennas, are then detected 108. A determination 110 is then made as to whether the further transmissions can be decoded in accordance with the preferred phase offset. If further transmissions can not be decoded, then further adjustments of the requested phase and amplitude are suspended 112. If further transmission can be decoded, then further adjustments of the requested phase and amplitude are enabled 114. Further transmissions from the wireless communication network are continued to be detected 108, until a determination 110 is made that further transmissions can be decoded.

Figure 5:
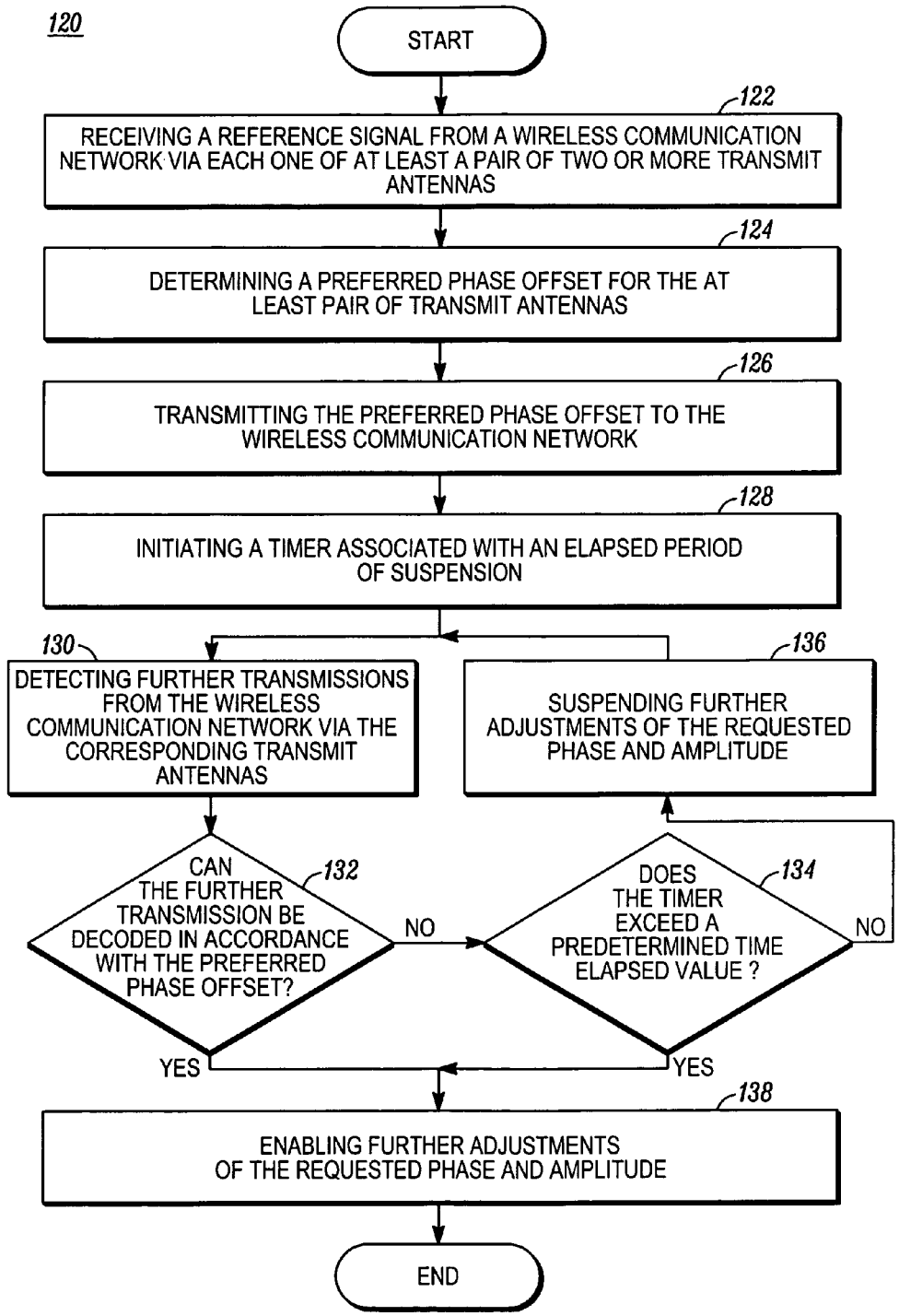
FIG. 5 is a flow diagram of a method for synchronizing a wireless communication device and a wireless communication network having two or more transmit antennas, which support transmit diversity, in accordance with at least a further embodiment of the present invention.

FIG. 5 illustrates a flow diagram of a method 120 for synchronizing a wireless communication device and a wireless communication network having two or more transmit antennas, which support transmit diversity, in accordance with at least a further embodiment of the present invention. Similar, to the method illustrated in FIG. 4, a reference signal is received 122 from a wireless communication network, via each one of at least a pair of two or more transmit antennas, and a preferred phase offset is then determined 124 for the at least pair of transmit antennas and then transmitted 126 to the wireless communication network.

A timer is then initiated 128, which tracks the elapsed period during which further adjustments of the requested phase and amplitude of the signals being transmitted using transmit diversity have been suspended.

Further transmissions from the wireless communication network, via the corresponding transmit antennas, are then detected 130. A determination 132 is then made as to whether the further transmissions can be decoded in accordance with the preferred phase offset. If further transmissions can not be decoded, then a determination 134 is made as to whether the current value of the timer exceeds a predetermined time elapsed value, which in at least some instances corresponds to the expected maximum time needed for the wireless communication network to receive the requested preferred phase offset and to synchronize to the same. If the current value of the timer does not exceed a predetermined time elapsed value and if further transmissions can not be decoded in accordance with the preferred phase offset, then further adjustments of the requested phase and amplitude are suspended 136. If either further transmission can be decoded, or the timer has exceeded the predetermined time elapsed value, then further adjustments of the requested phase and amplitude are enabled 138. Further transmissions from the wireless communication network are continued to be detected 130, until a determination 132 is made that further transmissions can be decoded, or a determination is made 134 that the value of the timer exceeds the predetermined time elapsed value. In at least some instances enabling further adjustments of the requested phase and amplitude includes entering a normal closed loop mode of operation.

In accordance with at least some embodiments of the present invention, the wireless communication device may forgo attempting to decode further transmissions in accordance with the preferred phase offset for purposes of enabling further adjustment requests, in favor of a determination that the value of the timer exceeds the predetermined time elapsed value.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method for synchronizing a wireless communication device and a wireless communication network having two or more transmit antennas, which support transmit diversity, the method comprising:
    receiving a reference signal from the wireless communication network via each one of at least a pair of the two or more transmit antennas;
    determining a preferred phase offset for the at least pair of transmit antennas;
    transmitting the preferred phase offset to the wireless communication network;
    detecting further transmissions from the wireless communication network via the corresponding transmit antennas; and
    suspending transmission of any further preferred phase offset to the wireless communication network including further requested adjustments of phase and amplitude of communications transmitted using the at least pair of transmit antennas until further transmissions are received from the wireless communication network via the corresponding transmit antennas, which can be decoded in accordance with the preferred phase offset;
    wherein suspending transmission of any further preferred phase offset to the wireless communication network includes
    receiving a further transmission,
    determining if the transmission can be decoded in accordance with the preferred phase offset,
        if the transmission can be decoded, enabling transmission of a further preferred phase offset,
        if the transmission can not be decoded, continue to request the previously requested preferred phase offset.

2. A method in accordance with claim 1 wherein determining a preferred phase offset includes determining a difference in phase, which is quantized into one of four phase differentials.

3. A method in accordance with claim 2 wherein the preferred phase offset is encoded in one or more messages to be transmitted to the wireless communication network using a pair of bits.

4. A method in accordance with claim 3 wherein the pair of bits are encoded as part of one or more assigned communication slots.

5. A method in accordance with claim 1 wherein determining a preferred phase offset includes determining a difference in phase, which is quantized into one of eight phase differentials.

6. A method in accordance with claim 5 wherein the preferred phase offset is encoded in one or more messages to be transmitted to the wireless communication network using three bits.

7. A method in accordance with claim 6 wherein the encoding for the preferred phase offset additionally includes an additional bit for encoding one of two preferred power adjustments.

8. A method in accordance with claim 1 wherein the preferred phase offset is associated with the time difference of arrival of the reference signals corresponding to each of the associated transmit antennas.

9. A method in accordance with claim 1 wherein enabling further adjustments of the requested phase and amplitude includes entering a closed loop mode of operation.

10. A method in accordance with claim 1 wherein an initial preferred phase offset is defined using a repeated fixed bit pattern.

11. A method in accordance with claim 1 wherein at the beginning of the suspension of further adjustments a timer is initiated and wherein during the suspension, if the timer exceeds a predetermined time elapsed value, the suspension is terminated and further adjustments of the phase and amplitude are allowed.

12. A method in accordance with claim 11 wherein the predetermined time elapsed value exceeds a defined maximum time needed for the wireless communication network to receive the preferred phase offset and synchronize to the same.

13. A method in a wireless communication device for synchronizing the wireless communication device with a wireless communication network having two or more transmit antennas, which support transmit diversity, the method comprising:
    receiving a reference signal from the wireless communication network via each one of at least a pair of the two or more transmit antennas;
    determining a preferred phase offset for the at least pair of transmit antennas;
    transmitting the preferred phase offset to the wireless communication network;

initiating a timer having a value corresponding to the amount of time, which has elapsed since the timer was initiated; and suspending transmission of any further preferred phase offset to the wireless communication network including further requested adjustments of phase and amplitude of communications transmitted using the at least pair of transmit antennas until the value of the timer exceeds a predetermined elapsed time value.

14. A communication controller for use in a wireless communication device comprising:

a synchronization controller;

interface circuitry, coupled to the synchronization controller, for establishing and maintaining a communication connection with a wireless communication network; and a decoder coupled to the interface circuitry and the synchronization controller for decoding messages received from the wireless communication network, via the interface circuitry;

wherein the synchronization controller is adapted for receiving a reference signal transmitted from the wireless communication network via each one of a plurality of associated transmit antennas, determining a preferred phase offset relative to each of the associated transmit antennas, transmitting the preferred phase offset to the wireless communication networks, and suspending transmission of any further preferred phase offset to the wireless communication network including further requested adjustments of phase and amplitude of communications transmitted using the plurality of associated transmit antennas until further transmissions are received from the wireless communication network which can be decoded in accordance with the preferred phase offset; and wherein the synchronization controller includes a timer which is adapted to be initiated, when the preferred phase offset is initially transmitted, and is adapted to determine if a predetermined time elapsed value has been exceeded prior to further transmissions having been received, which can be decoded in accordance with the preferred phase offset.

15. A communication controller in accordance with claim 14 wherein the interface circuitry includes a transceiver coupled to one or more antennas.

16. A communication controller in accordance with claim 14 wherein the synchronization controller is adapted to produce a repeated fixed bit pattern associated with an initial preferred phase offset in connection with suspending further adjustments of the requested phase and amplitude.

17. A communication controller in accordance with claim 14 wherein the synchronization controller includes a control input coupled to a control signal produced by the decoder, where the decoder is adapted to produce the control signal responsive to attempts to decode messages received from the wireless communication network.

18. A communication controller in accordance with claim 14 wherein the decoder includes an input, which is adapted to receive the determined preferred phase offset.

19. A communication controller in accordance with claim 14 wherein the wireless communication device is a cellular telephone.

* * * * *